May 26, 1964

R. C. IMMEL 3,134,137

MOLDING AND CURING MACHINES

Filed Nov. 13, 1961

INVENTOR
RALPH C. IMMEL

BY Alexander + Dowell
ATTORNEY

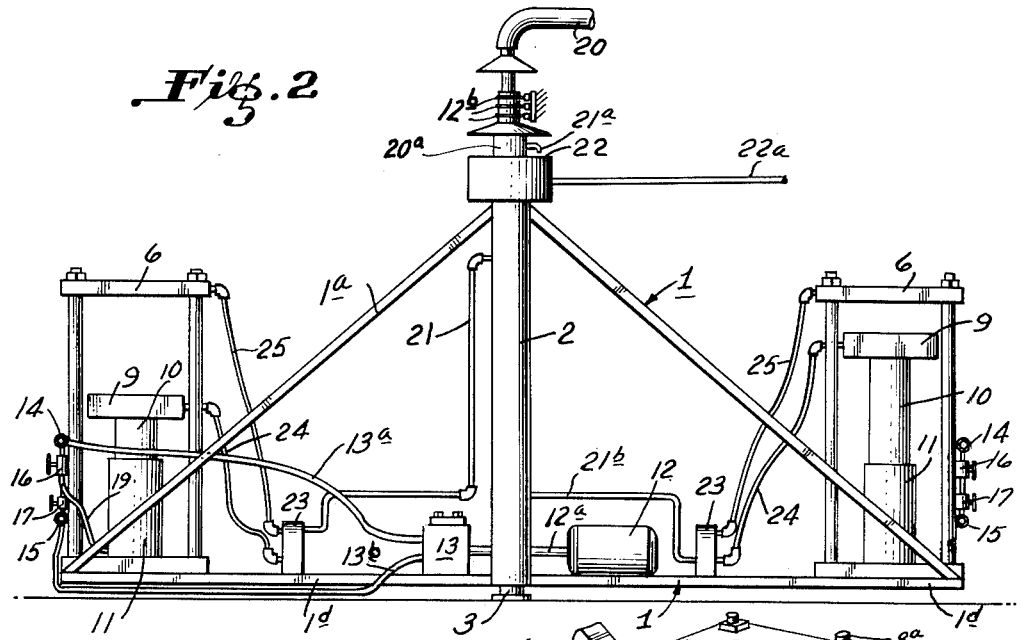
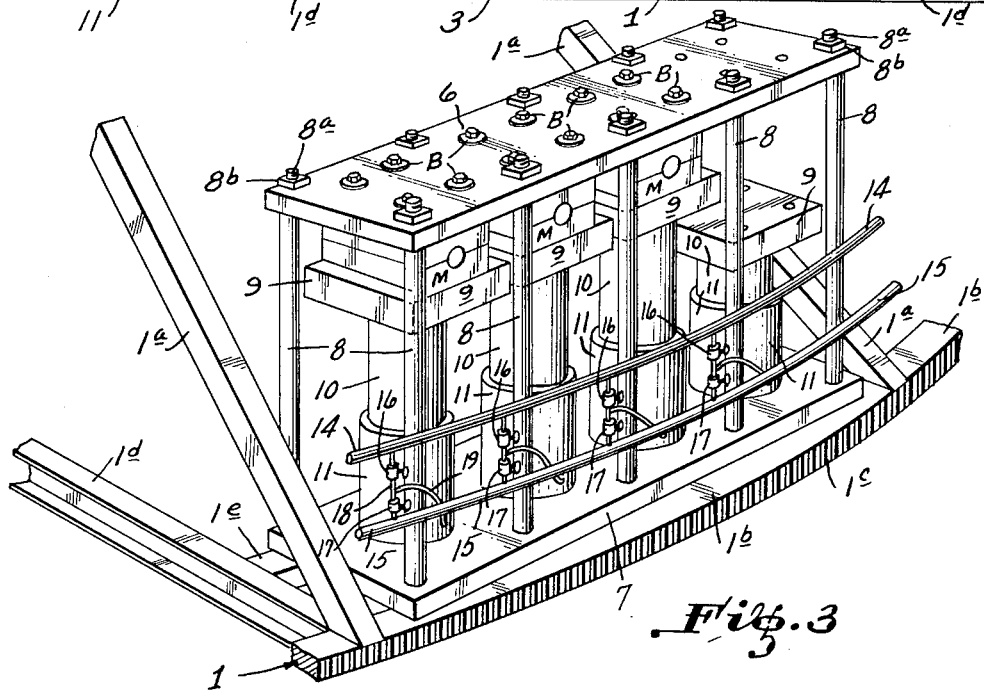

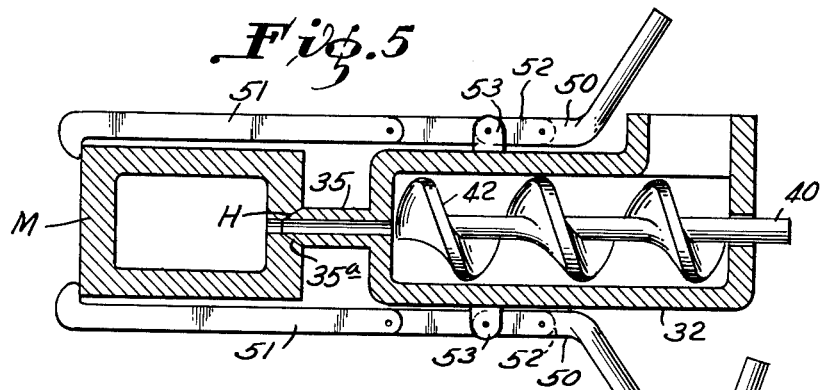
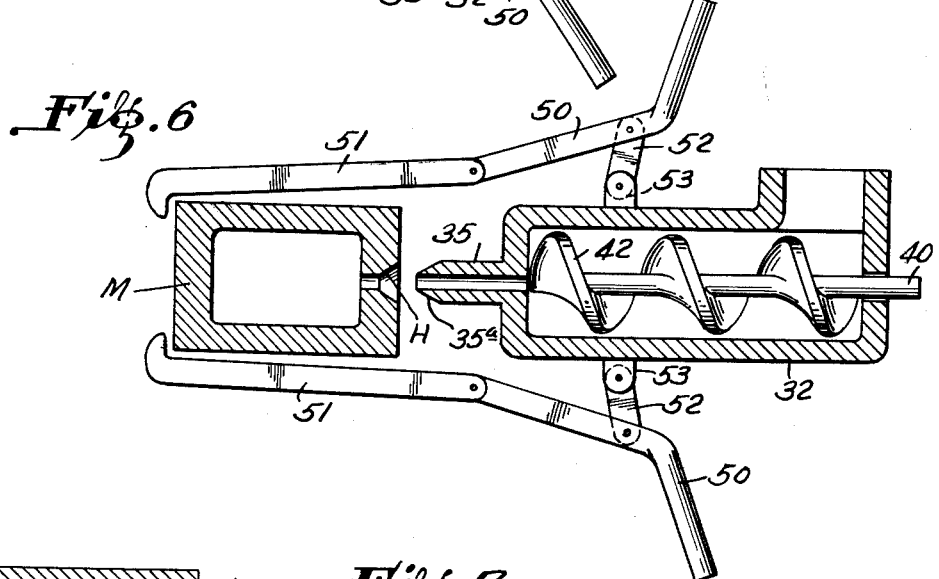
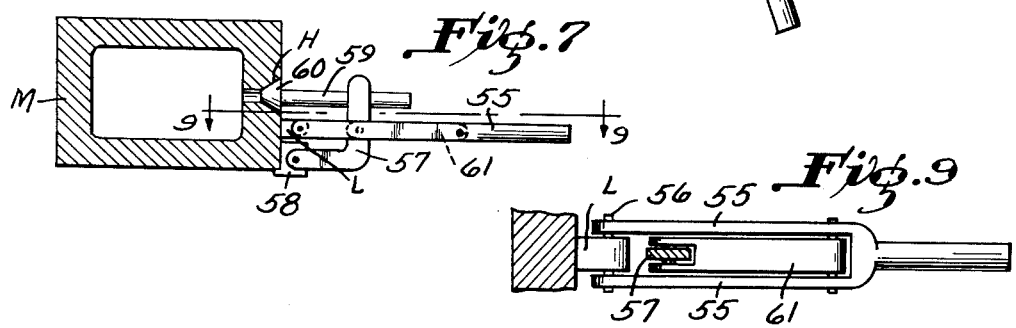
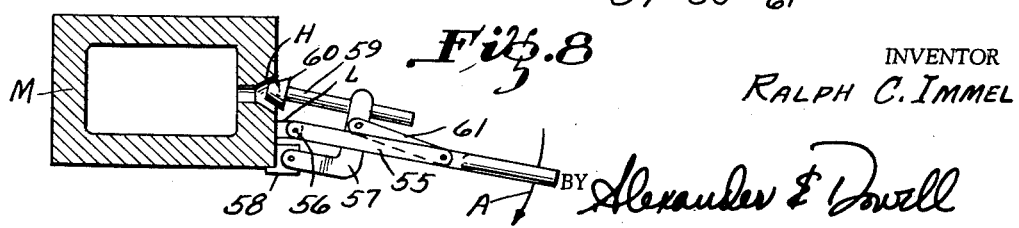
INVENTOR
RALPH C. IMMEL
BY Alexander & Dowell
ATTORNEYS

United States Patent Office 3,134,137
Patented May 26, 1964

3,134,137
MOLDING AND CURING MACHINES
Ralph C. Immel, 5530 Palomar Lane, Dallas, Tex.
Filed Nov. 13, 1961, Ser. No. 151,706
3 Claims. (Cl. 18—4)

This invention relates to improved apparatus for charging, heating and pressurizing molds for products made of a heat-curable material, and more particularly relates to an apparatus comprising an annular frame carrying mold presses arranged continuously around the periphery of the frame, which frame is rotated to move the mold presses past stationary loading and unloading stations.

When molding products from heat-curable material, it has been customary according to prior-art methods to mold a plurality of similar articles in a large multiple-cavity mold. Ordinarily, the material, such as neoprene or rubber, is loaded in the form of cold slugs into the molds and is subsequently heated in the molds to bring the material up to the vulcanizing temperature, the heat then being maintained until the molded product is completely cured. According to these prior-art methods the material is usually masticated and then formed, as by extrusion, into a plurality of slugs of the correct weight to fill each mold cavity. These slugs are then cooled and stock-piled until they are to be used. However, in these prior-art molding methods, because of the fact that the slugs are loaded into the molds cold, a considerable time as well as energy must be expended in order to bring the material up to vulcanizing temperature. Especially where the product to be molded has an appreciable thickness, there is a strong tendency for the outside of the product to become "overcooked" while the inside of the product remains less than fully cured. This disadvantage is extremely serious especially where the product is subjected to wear which eventually abrades away its outer portions, for instance as in the case of tank treads. Such tank treads tend to wear out unnecessarily quickly when the outermost layers have been worn away because of the fact that the inner layers are somewhat less than fully cured.

It is an object of the present invention to provide an apparatus to be used for molding and curing products in such a manner as to overcome the above disadvantages, while at the same time reducing by approximately 50% the amount of time and heat required to cure the molded product.

A more specific object of the invention is to provide a continuously rotating molding apparatus which rotates past one or more stationary loading and unloading stations at such a rate that the transit time between a loading station and the next unloading station is equal to the time required to fully cure the product.

It is another major object of the invention to provide apparatus in which the heating, masticating and mold charging steps of the method are carried out by apparatus located at the loading station so that the masticated material is delivered directly and substantially at curing temperature into a mold cavity. It is a corollary object of this invention to provide apparatus for controlling the rate of delivery of the material so that this rate equals the rate at which the material is used in the molding apparatus, whereby the material does not pause for a long period of time between the masticator and the mold cavity. Another corollary object of the invention is to provide means for controlling the temperature of the material as it issues from the source so that it is extruded substantially at, or just below, the vulcanizing temperature. By this means, the above mentioned disadvantage of loading cold slugs into the mold cavities and then trying to heat them sufficiently to cure the innermost material without overcooking the outermost material is avoided. This introduction of the heated material into the molding apparatus reduces by approximately 50% the time and energy required to completely cure the molded product.

Still another object of the invention is to provide apparatus particularly adapted for supporting, heating and pressurizing portable single-cavity molds and for carrying out a substantially continuous molding process wherein the molds themselves are never permitted to cool. The time required to unload and reload a mold after one set of products has been cured, and the mold is about to be charged for the curing of another set of products, has been reduced to a minimum, and since the molds are never out of the heating and pressurizing apparatus, there is very little tendency toward cooling of the molds themselves. Moreover, a better and more uniform product results because of the fact that all of the products are molded and cured under precisely the same conditions. The present invention also includes novel toggle clamping means for holding the extruder against the mold charging hole and for closing the hole after the charge has been extruded therethrough, the extruder being displaceable in the direction of travel of the molds so that the rotation of the frame need not be stopped during charging of the molds.

Still another object of the invention is to provide an hydraulic pump mounted directly on the rotary frame which supports the mold presses, thereby avoiding the necessity of high pressure rotary joints which would be required if the pump for the mold closing pressure were located externally of the rotary frame and coupled to said presses by piping. Electricity to operate a motor for driving the pump can be easily brought into the frame by slip ring means located on the spindle on which the frame is journaled. Steam for the purpose of heating the molds can be brought into the frame through a rotary steam joint which need not operate at particularly high pressure.

It is also an object of this invention to provide convenient control means for each mold press, said control means being located at the mold so as to permit manual control of the hydraulic pressure in each press by the person unloading or loading that particular press at one of said loading or unloading stations.

Further objects and advantages of this invention will become apparent from the following discussion of the drawings, wherein:

FIG. 2 is an enlarged cross-sectional view taken along line 2—2 of FIG. 1, only the nearest rows of presses being illustrated, and the background presses having been omitted for the sake of emphasizing the pressure pump and steam lines carried by the frame;

FIG. 3 is an enlarged perspective view of one bank of presses carried by the rotary frame of the apparatus;

FIGS. 5 and 6 show a mold charging extruder in cooperative relation with a mold and show suitable toggle clamp means for holding the former against the latter, the figures being shown partly in cross-section; and FIGS. 7, 8 and 9 show plug means for closing the charging hole of a mold after it has been filled by the extruder to prevent leakage of the charge therefrom during curing.

Figure 1:
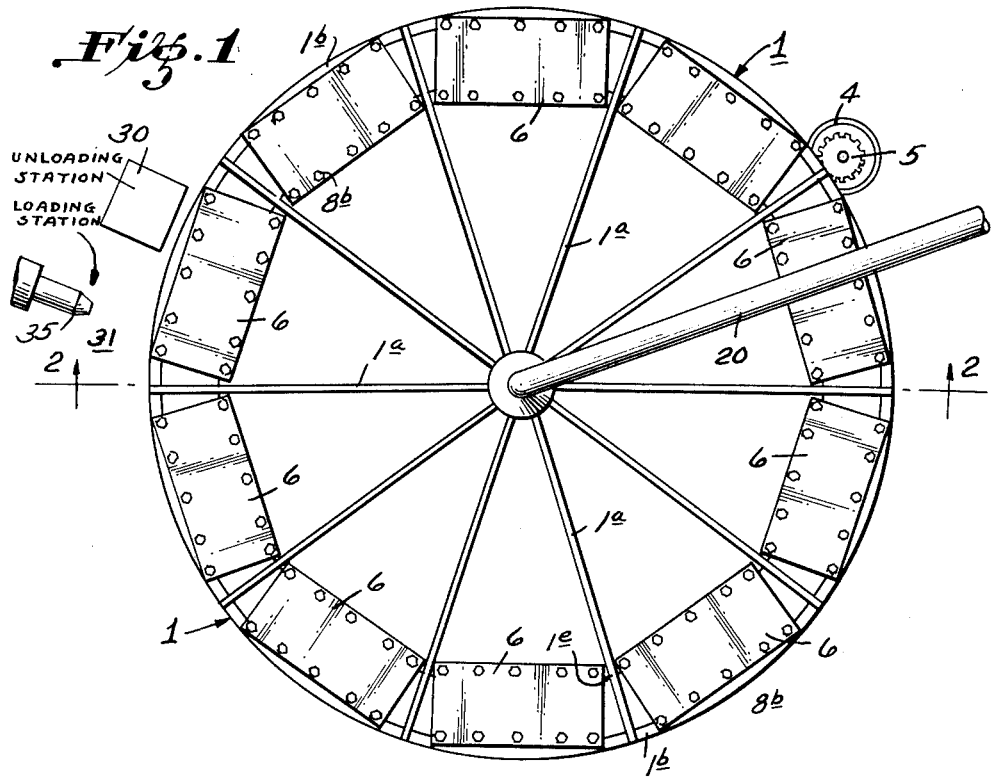
FIG. 1 is a plan view showing a rotary pressurizing and heating apparatus located adjacent to a stationary unloading station and showing a loading station which also includes an extruder.

Referring now to the drawings, the present apparatus comprises a rotary frame 1 fabricated of metal beams to form in vertical radially-disposed planes triangular truss sections, the sections being supported on an upright hub column 2 and including diagonal reinforcing members 1a welded at their upper ends to the column 2 and welded at their lower ends to a circular member 1b having gear teeth 1c located around its outer periphery for the purpose hereinafter discussed. The frame also includes horizontal spoke members 1d which are secured at their outer ends to the circular member 1b at the points of intersection of the diagonal members 1a therewith. The inner ends of the horizontal spoke members 1d are also welded to the supporting column 2, and this column is journaled on a stationary vertical spindle 3 as can best be seen in FIG. 2.

The frame also includes member 1e located substantially coaxially with and spaced from the member 1b, as shown in FIGS. 1 and 3. The column 2 is journaled on bearings (not shown) supported on the spindle 3, and the entire frame is rotated about said spindle by a drive means 4 which rotates a spur gear 5 having teeth which mesh with the teeth 1c on the outer periphery of the circular frame member 1b.

The horizontal frame members 1e and 1b support a plurality of banks of mold presses in the manner illustrated in FIGS. 1, 2 and 3. Each mold press comprises an upper plate 6 and a lower plate 7 which rests upon the members 1b and 1e, the plates 6 and 7 being secured together in mutually parallel relation by a plurality of vertical tie bars 8 which may be fixed to the plates 6 and 7 by any convenient means, such as by threaded end sections 8a secured by nuts 8b as best illustrated in FIG. 3. Each of the above plates 6 forms the upper platen of four different presses, and these upper plates 6 are fabricated with hollow passageways therein (not shown) into which steam or other heated fluid may be introduced in the manner to be hereinafter explained. A plurality of individual platens 9 comprise in each case the lower platen of a press and these platens are also provided with passageways therein to receive heated fluid. The lower platens 9 are each supported on the plunger 10 of a press 11 which is actuated by hydraulic pressure in the manner to be hereinafter explained so that the press can be lowered as shown to the right in FIG. 3 or can be raised toward the upper platen 6 as shown in the three presses located to the left in FIG. 3.

The frame 1, FIG. 2, carries a motor 12 which is coupled by a shaft 12a with an hydraulic pump 13, for example pumping water. The motor is connected with a plurality of slip rings generally designated by the reference character 12b, which slip rings are coupled to an external source of power (not shown). The hydraulic pressure from the pump 13 passes through a line 13a and to a distributing pipe 14, which pipe can also be seen in FIG. 3 and comprises an annular continuous manifold supplying pressure to all of the presses in the manner to be hereinafter described. Adjacent each of the presses are located two valves 16 and 17 which are connected in series between the manifold pressure pipe 14 and another similar pipe 15 serving as a return for released hydraulic fluid from the presses. The pipe 15 is returned to the hydraulic pump 13 by a line 13b.

Adjacent each press is an upper valve 16 and a lower valve 17 connected together by a length of tubing 18 which has a T-branch 19 coupled with the lower end of the adjacent cylinder 11. By this means, when the valve 16 is opened and the valve 17 is closed the press is raised to elevated position to pressurize the material in the molds M located between the platens 6 and 9, respectively. On the other hand, if the valve 16 is closed and the valve 17 is opened the pressure within the cylinder 11 is released to flow into the return pipe 15, thereby allowing the mold press to open and assume the position of the rightmost press illustrated in FIG. 3. Any suitable valve means may be used for controlling the hydraulic pressure to the presses; for instance, the function of the two valves 16 and 17 can be combined into a single plug valve operated by one lever.

The rotating frame is also supplied with steam under pressure which is brought into the frame through an overhead duct 20 connected through a rotary joint 20a with a pipe 21 carried by the column 2. A stationary annular trough 22 is provided around the upper end of the column to catch condensate dripping from a pipe 21a connected within the column 2 with the pipe 21b serving as a condensate return. The steam pipe 21 is suitably connected with manifold means 23 from which steam under pressure can be circulated into the upper and lower platens 6 and 9 respectively. Flexible hoses 24 and 25 are shown coupling the manifolds 23 with the platens, some of the hoses serving to supply steam to the platens, and others of the hoses serving as steam returns. The returned steam leaves through the pipes 21b and 21a and its condensate is caught in trough 22 and returned as feed-water to a boiler (not shown) by way of pipe 22a.

Figure 4:
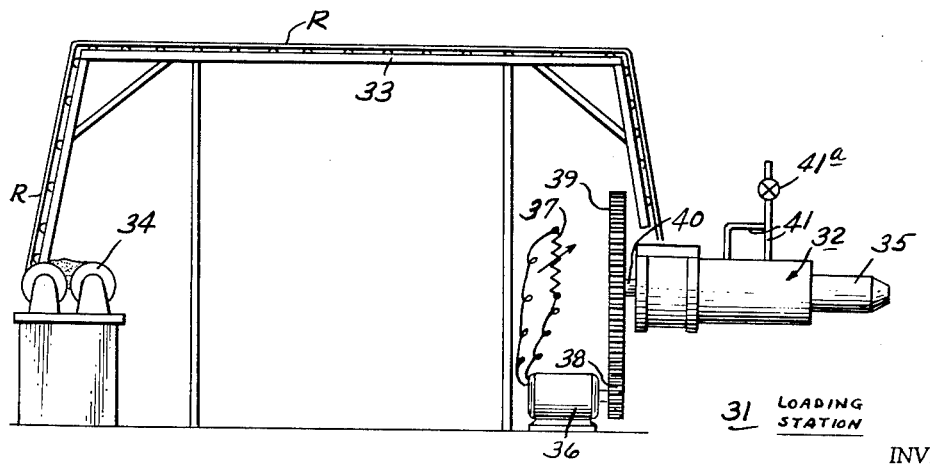
FIG. 4 is an elevation view schematically showing a masticator and an extruder located at a loading station and mutually joined together by an overhead conveyor.

Referring now to FIGS. 1 and 4, it will be seen that at least one unloading station 30 is located adjacent the rotary apparatus, and may include a table on which a worker places each cured product as it is removed from a mold as the machine passes. Each unloading station 30 is located immediately ahead of an associated loading station 31 which in turn is located immediately adjacent an extruder 32, FIG. 4.

The extruder is fed with a ribbon R of masticated material which passes over a conveyor 33 and travels to the extruder from a conventional roll masticator 34 having adjustable means (not shown) for setting the dimensions of the ribbon R. The continuous ribbon of rubber enters the extruder which contains means for driving the material out through an extrusion head 35 which, as hereinafter explained, serves to load each mold cavity as it passes the loading station. The extruder is driven by a motor 36 having an adjustable speed control schematically represented by a potentiometer 37 so that the rate at which the material is extruded can be adjusted to precisely meet the requirements of the molds being loaded. The motor is coupled to the extruder by a reduction gear drive 38—39 serving to rotate the shaft 40 of the extruder 32, which shaft turns an auger 42, FIGS. 5 and 6.

Ordinarily the ribbon R will be heated to a rather high temperature by the frictional working thereof in the masticator 34 and in the extruder 32. However, if it is necessary to add heat to the material to bring it up substantially to the temperature at which the material is cured, i.e. about 300° F. in the case of rubber, steam may be introduced into jackets (not illustrated) around the extruder through pipes 41, and the rate at which the steam is circulated can be controlled by a valve 41a conveniently located near the extruder and controlling the rate of flow of the steam into the pipes 41.

The extruder 32 is preferably mounted on a movable support so that it can move circumferentially with the rotary frame to follow the movement of the latter while charging a mold. In actual practice, the extruder is suspended from above on strips (not shown) which support its weight and maintain it in position. The amount of movement is small, only about ¼ inch during the total time required for charging a mold.

FIGS. 5 and 6 illustrate in greater detail the engagement of the extruder head 35 with the charging hole H in a mold M. The head has a conical tip 35a which precisely fits the hole H, and the extruder body 32 is provided with a pair of tongs including toggle linkages to releasably hold the extruder in place during charging of the mold. These linkages comprise two handle members 50 coupled with hooked members 51 at articulated joints. The handle members 50 are also coupled with toggle links 52 which are pivotally anchored to opposed lugs 53 welded to the body 32 of the extruder. The extruder is clamped to a mold by passing the hooked members 51 between the press platens 6 and 9 to the position shown in FIG. 6 and then snapping the handle members 50 toward each other to drive the toggle links 52 into alignment with the members 50 and thereby clamp the extruder to the mold. When the mold has been charged, the handle members 50 are again released to the positions shown in FIG. 6.

The molds must then be closed by plugging the holes H during the curing of the rubber charge therein, and one example of a suitable closure means is shown in FIGS. 7, 8 and 9. The molds M are equipped with a lug L welded thereto and supporting the end of a handle member 55 of a toggle linkage, as by a pin 56. Another member 57 is pivotally attached at one end to an abutment block 58, and at its other end carries a plug 59 having a conical tip 60 to plug the hole H. A toggle link 61 is pivotally connected at one end to said other member 57 and at its other end to the handle member 55. The plug 59 can be moved free of the hole H by breaking the toggle linkage in the direction of the arrow A in FIG. 8. On the other hand, the plug 59 can be tightly maintained in the hole H by moving the handle member 55 to the position shown in FIG. 7. When fully opened, the plug toggle assembly hangs down free of the front face of the mold and out of the way of the extruder.

In operation, it is contemplated that at least one worker will be located at each loading and unloading station area and that there may be plural loading and unloading areas around the periphery of the rotary frame. In the actual apparatus presently being employed to manufacture tank treads, the frame is rotated at the rate of one revolution per hour, and precisely one hour is the curing time required to cure the rubber after it has been inserted in the molds and pressurized. However, if a different material were used, or if smaller articles were being molded, the rate of rotation of the frame could be changed by altering the rate of rotation of the drive means 4 or, alternatively, more stations could be located around the periphery of the frame so that each mold traveled less than one revolution before being opened and recharged. The curing time is therefore controlled by the rate of rotation of the drive means 4, and the extrusion rate is controlled by altering the position of the potentiometer 37 to adjust the rate of rotation of the motor 36. Also, the temperature of the extruded material is controlled by manipulating the valve 41a in control of the steam supplied to heat the extruder, as stated above.

As the frame rotates, when a mold approaches the unloading station 30, the valve 16 associated with the approaching press 11 is closed and the valve 17 is opened so that the press drops open as shown to the left in FIG. 2 or to the right in FIG. 3. The upper and lower halves of the mold M are bolted to the press platens 6 and 9, FIG. 3, by bolts B so that as a press drops open the mold is opened with it so that it can be stripped and then reclosed by closing the press supporting it. When the reclosed mold reaches the loading station 31, the toggle clamp engages the extruder 32 with the mold while a new charge is entered therein. Then the extruder is removed and the charging hole H is plugged by the plug 59 held in place by the linkage means shown in FIGS. 7, 8 and 9. The mold remains closed in this manner until it reaches the next unloading station.

I do not limit my invention to the exact form shown in the drawing, for obviously changes may be made therein within the scope of the following claims.

I claim:
1. Apparatus for charging, heating and pressurizing molds for molding heat-curable material, comprising
   (a) a frame journaled for rotation about a spindle;
   (b) an annular series of presses supported on the frame and moved between loading and unloading stations as the frame rotates, each press having opposed horizontally-disposed mold-clamping platens having fluid heating means;
   (c) a rotary pipe joint supported by said spindle and coupled with said fluid heating means;
   (d) an external source of heated fluid coupled with said rotary pipe joint;
   (e) slip ring means on said spindle for carrying electric power into the frame;
   (f) a motor driven hydraulic pump mounted in the frame and connected to receive power from said slip ring means;
   (g) valve means coupling the pump with each press to individually control the latter;
   (h) a material extruder head adjacent the loading station and including means for preheating said material and means for controlling the temperature of the material coming from the extruder to maintain it close to the curing temperature of said material;
   (i) each mold having a charge-receiving opening and the extruder head having a mating tip and having clamping means comprising toggle-jointed tongs attached to the extruder head and shaped to clamp to and grip a mold; and
   (j) drive means for rotating said frame at a continuous predetermined rate so that the transit time of each mold between loading and unloading stations will equal the time required to cure the material at said curing temperature.

2. In apparatus as set forth in claim 1, toggle-linkage means pivotally coupled to the mold; and opening-plugging means carried by said linkage means and positionable thereby to close said opening during curing of said material.

3. In apparatus as set forth in claim 1, means for controlling the rate of delivery of said material through said extrusion head to provide delivery of said material to a mold as soon as it reaches said curing temperature.

References Cited in the file of this patent
UNITED STATES PATENTS

| | | |
|---|---|---|
| 1,614,601 | Davis | Jan. 18, 1927 |
| 1,991,706 | Seabury | Feb. 19, 1935 |
| 2,333,056 | Thoreson et al. | Oct. 26, 1943 |
| 2,903,747 | Wucher | Sept. 15, 1959 |
| 2,917,776 | Dorman et al. | Dec. 22, 1959 |
| 3,005,235 | Patera | Oct. 24, 1961 |
| 3,070,843 | Jurgeleit | Jan. 1, 1963 |